US009602228B1

(12) United States Patent
Warnes (10) Patent No.: US 9,602,228 B1
(45) Date of Patent: Mar. 21, 2017

(54) METHOD AND APPARATUS FOR TRANSMISSION AND RECEPTION OF A SIGNAL OVER MULTIPLE FREQUENCIES WITH TIME OFFSET ENCODING AT EACH FREQUENCY

(71) Applicant: Gregory R. Warnes, Albany, GA (US)

(72) Inventor: Gregory R. Warnes, Albany, GA (US)

( * ) Notice: Subject to any disclaimer, the term of this patent is extended or adjusted under 35 U.S.C. 154(b) by 0 days.

(21) Appl. No.: 15/130,084

(22) Filed: Apr. 15, 2016

Related U.S. Application Data (63) Continuation of application No. 14/160,473, filed on Jan. 21, 2014.

(60) Provisional application No. 61/754,286, filed on Jan. 18, 2013.

(51) Int. Cl.
 H04J 3/16 (2006.01)
 H04J 3/02 (2006.01)
 H04L 27/04 (2006.01)

(52) U.S. Cl.
 CPC ............ H04J 3/1694 (2013.01); H04J 3/025 (2013.01); H04L 27/04 (2013.01)

(58) Field of Classification Search
 CPC ...... H04B 1/005; H04B 1/0483; H04B 1/406; H04B 7/0413; H04B 7/0671; H04L 27/2607; H04L 27/26; H04L 27/263; H04L 27/2647; H04L 25/0024; H04L 1/0003; H04W 52/42; H04W 52/241; H04W 52/265; H04W 16/14; H04W 24/02; H04W 28/06; H04W 72/044; H04W 72/085; H04W 88/08
 See application file for complete search history.

(56) References Cited

U.S. PATENT DOCUMENTS

| 3,787,853 | A | 1/1974 | Brookner |
| 4,520,408 | A | 5/1985 | Velasquez |
| 5,020,015 | A | 5/1991 | Jones et al. |
| 5,371,548 | A | 12/1994 | Williams |
| 5,408,496 | A | 4/1995 | Ritz et al. |
| 5,638,405 | A | 6/1997 | Hendrickson et al. |
| 5,861,965 | A | 1/1999 | Koren et al. |
| 5,966,048 | A | 10/1999 | Thompson |
| 6,072,612 | A | 6/2000 | Liou et al. |
| 6,256,290 | B1 | 7/2001 | Ramesh |
| 6,269,075 | B1 | 7/2001 | Tran |
| 6,381,053 | B1 | 4/2002 | Fathallah et al. |
| 6,452,989 | B1 | 9/2002 | Friedman |
| 7,113,121 | B1 | 9/2006 | Sutardja et al. |
| 7,194,039 | B2 | 3/2007 | Hunton |
| 7,266,156 | B2 | 9/2007 | Montojo et al. |

(Continued)

FOREIGN PATENT DOCUMENTS

| DE | 19634487 A1 | 3/1998 |
| JP | 59211399 A | 11/1984 |

*Primary Examiner* — Dung B Huynh
(74) *Attorney, Agent, or Firm* — Simpson & Simpson, PLLC (57) ABSTRACT

A method of processing a signal including the steps of: (a) modulating the signal using a modulator corresponding to a modulation, (b) sending the modulated signal over multiple frequencies where the signal is offset in time in each frequency, (c) receiving the signal over the multiple frequencies, (d) reconstructing the sent signal by reversing the time delay and combining the received signal from each frequency, and (e) demodulating the received combined signal using a demodulator corresponding to the modulation used in (a).

10 Claims, 8 Drawing Sheets

(56) References Cited

U.S. PATENT DOCUMENTS

| | | |
|---|---|---|
| 8,121,020 B1 | 2/2012 | von der Embse |
| 8,249,459 B2 | 8/2012 | Iwamura et al. |
| RE43,812 E | 11/2012 | Schilling |
| 8,325,592 B2 | 12/2012 | Higuchi et al. |
| 8,571,126 B2 | 10/2013 | Abbasfar et al. |
| 2002/0196869 A1 | 12/2002 | Friedman |
| 2003/0202611 A1* | 10/2003 | Montojo ............... H04L 5/0019 375/260 |
| 2004/0053590 A1* | 3/2004 | Marholev ............ H03H 11/04 455/213 |
| 2004/0208624 A1 | 10/2004 | Fathallah et al. |
| 2004/0253938 A1* | 12/2004 | Vaara .................. H03D 7/1433 455/334 |
| 2005/0254592 A1* | 11/2005 | Naguib ................ H04B 7/0417 375/267 |
| 2006/0098760 A1 | 5/2006 | Shen et al. |
| 2007/0280372 A1 | 12/2007 | Egri et al. |
| 2008/0033685 A1* | 2/2008 | Shand .................... H04L 67/04 702/122 |
| 2008/0056397 A1 | 3/2008 | Li et al. |
| 2008/0181327 A1* | 7/2008 | Lee ........................ H04B 7/028 375/267 |
| 2008/0291971 A1 | 11/2008 | Chin Po Shin et al. |
| 2009/0201214 A1* | 8/2009 | Falk ..................... H01Q 3/2605 343/853 |
| 2010/0020737 A1* | 1/2010 | Fukumasa .............. H04B 7/022 370/312 |
| 2010/0178057 A1* | 7/2010 | Shieh .................. H04L 25/0224 398/79 |
| 2010/0183090 A1* | 7/2010 | Abbasfar ............. H04L 27/2614 375/296 |
| 2010/0208779 A1 | 8/2010 | Park et al. |
| 2010/0248687 A1 | 9/2010 | Barsoum et al. |
| 2010/0266050 A1* | 10/2010 | Keidar .................. H04H 20/18 375/240.25 |
| 2011/0013716 A1* | 1/2011 | Brodzik ................ G01S 13/003 375/295 |
| 2011/0158361 A1 | 6/2011 | Dent et al. |
| 2012/0002661 A1* | 1/2012 | Nishimoto ........... H04B 7/0671 370/345 |

\* cited by examiner

METHOD AND APPARATUS FOR TRANSMISSION AND RECEPTION OF A SIGNAL OVER MULTIPLE FREQUENCIES WITH TIME OFFSET ENCODING AT EACH FREQUENCY

CROSS-REFERENCE TO RELATED APPLICATIONS

This application is a Continuation of application Ser. No. 14/160,473, filed on Jan. 21, 2014, which patent application claims the benefit under 35 U.S.C. §119(e) of U.S. Provisional Patent Application No. 61/754,286, filed Jan. 18, 2013, which applications are incorporated herein by reference in their entireties.

FIELD OF THE INVENTION

The invention broadly relates to signal processing in wired, optical, and wireless communication.

BACKGROUND OF THE INVENTION

Current techniques for signal processing in wired and wireless communication require sub-dividing the available bandwidth along one or more dimensions (i.e., frequencies, time, signal shape, signal phase, etc.), with the consequence that supporting a larger number of logical channels either requires increasing the available bandwidth (e.g., number of frequencies), or reducing the share of total bandwidth used for each logical channel. This results in bandwidth becoming a limited shared resource, subject to congestion and even exhaustion.

This method provides an exceptionally large number of logical channels over a set of shared signal frequencies without interleaving or subdividing the available bandwidth. It uses the statistical properties of signals coupled with a simple multiplexing technique to enable each channel to fully employ all standard signal properties (dimensions) concurrently. It is compatible with many existing signal encoding modulation/demodulation) techniques, and can leverage existing signal processing technologies.

BRIEF SUMMARY OF THE INVENTION

A method of processing a signal including the steps of: (a) modulating the signal using a modulator corresponding to a modulation, (b) sending the modulated signal over multiple frequencies where the signal is offset in time in each frequency, (c) receiving the signal over the multiple frequencies, (d) reconstructing the sent signal by reversing the time delay and combining the received signal from each frequency, and (e) demodulating the received combined signal using a demodulator corresponding to the modulation used in (a).

A method of processing a signal, including the steps of (a) modulating the message to be sent to form a baseband signal using a specified modulation and baseband frequency, (b) converting the baseband signal to multiple transmission frequencies, (c) applying a time delay offset to the signal in each transmission frequency, (d) combining the multiple transmission frequencies into a single combined signal, (e) transmitting the combined signal, followed by (f) receiving the combined signal, (g) separating the combined signal into components corresponding to each transmission frequency, (h) reversing the time delay offset used in (c) for the signal in each transmission frequency, (i) converting the signal for each transmission frequency to the frequency of the baseband signal, (j) reconstructing an estimate of the original baseband signal by combining the baseband signal from each transmission frequency, and (k) demodulating the combined baseband signal to recover the original message using a demodulator corresponding to modulation utilized in (a).

The present invention provides a method for multiplexing a large number of logical communications channels (data streams) over a set of shared signal frequencies, and does so without interleaving or subdividing the available bandwidth by employing offset time delays applied to each frequency that are unique to each logical communications channel. This allows the individual channels to fully employ all standard signal properties (dimensions) concurrently. Consequently, the bandwidth can be used more effectively by (1) allowing a larger number of communications channels to share the same set of frequencies, and/or (2) enabling each communications channel to achieve a higher data rate, and/or (3) achieve a lower error rate for each communication channel.

The invention can be utilized with any transmission medium capable of carrying multiple, nearly-continuous real or complex valued signals, including wired and wireless radio-frequency and fiber-optic systems. Further, it is compatible with many existing modulation, demodulation, decoding and other signal processing techniques. As a consequence it possible to develop systems based on this new invention while leverage existing signal processing equipment, techniques, and technologies.

Multiple independent communications streams over a shared (wired or wireless) resource can be accomplished using multiplexing. Multiplexing combines one or more logical signals into a single signal by assigning each logical signal some unique combination of the properties of the signal. Current multiplexing approaches utilize a particular signal property, including:

1. Location (wireless) or Connectedness (wired): Space-division multiplexing
2. Carrier Frequency: Frequency-division multiplexing
3. Time: Time-division multiplexing
4. Signal shape: Code-division multiplexing
5. Polarization: Polarization-division multiplexing
6. Orbital angular momentum (experimental)

The key concept for this invention is to send the same signal over multiple frequencies with a different time offset (delay) in each frequency, using the same modulation technique in each frequency. The original signal is then reconstructed by reversing this process.

The additive nature of signals, and the statistical properties of sums of values with the same mean (signal value) and differing noise (or interference) [cf. the central limit theorem], means that a message broadcast over multiple frequencies can be recovered with high fidelity even from very noisy samples.

By selecting unique offsets, multiple independent communication channels can utilize the same set of frequencies without the need to subdivide by other properties of the signal (e.g., time-division multiplexing). Provided that the number of frequencies and offsets is large enough, the number of concurrent channels can be exceptionally large. For instance, utilizing ten (10) non-overlapping frequencies, and sixteen (16) possible offsets, over one trillion logical channels are possible, $16^{10}=1.10e+12$, and the signal to noise ratio of the individual logical channels can be up to $\sqrt{(10)}=3.2$ times higher than the per-channel signal to noise ratio.

The process described herein provides a mechanism for multiplexing multiple data streams for transmission over a common medium and then for recovering the original data streams from the received transmission. It can be utilized in a variety of contexts by one or multiple senders and for one or multiple receivers.

BRIEF DESCRIPTION OF THE SEVERAL VIEWS OF THE DRAWING

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspect. The present invention is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The invention provides for sending multiple signals over a set of common transmission frequencies. Each signal of interest (logical channel) is frequency multiplied onto a set of shared transmission frequencies. Next, set of offset delays unique to the logical channel is applied to each of the transmission frequencies. This results in multiple copies of the signal of interest carried on different frequencies and with different offset in time. The individual transmission frequencies are then combined and transmitted over the shared transmission medium, which may also carry transmissions of other logical channels.

Upon reception, the process is reversed, with individual transmission frequencies being separated (e.g., by filtering and frequency division), followed by reversal of the offset delays corresponding to the logical channel of interest. This yields multiple time-aligned copies of the original signal of interest (plus noise and/or interference).

The use of a unique set of delay offsets for each logical channel allows the corresponding baseband modulated signal to be recovered, while the use of multiple copies of the signal of interest (one in each frequency) yields a substantial processing gain and corresponding improvement in effective signal to noise ratio.

The multiple logical channels provided may be used for multiple-access (e.g., for a cell-phone system), or for multiplexing (e.g., to provide a higher data throughput for a single data stream), or for a combination of both multiple access and multiplexing.

An individual device may include one or more transmitters, receivers, or both, and such transmitters and receivers may share physical or logical components.

The frequencies utilized by a specific logical channel are either all of or only a subset of the frequencies used by all logical channels.

A separate physical medium for each time-offset copy of the original signal instead of separate carrier frequencies over a shared transmission medium may be implemented.

Logical communications channel c is a data stream, for example, consisting of a single logical transmitter and one or more logical receivers intended to receive and decode the data stream originating from the transmitter. For clarity of exposition, we further assume the absence of frequency-specific fading, multi-path interference, and the near-far problem.

The process will be illustrated using binary (on-off) amplitude shift keying (ASK) modulation for two logical channels, each consisting of a single transmitter and receiver. In one example, two 8-bit messages are sent, encoded using simple binary amplitude modulation, a code length of $\frac{1}{100}$ sec=0.01 sec, and a guard period of $\frac{1}{4}$ of the code length. Single modulation will occur on 10 carrier frequencies, ranging from 1000 Hz to 1100 Hz. The waveform will be modeled with resolution 1100*50 Hz=55,000 Hz.

Setup

Figure 1A:
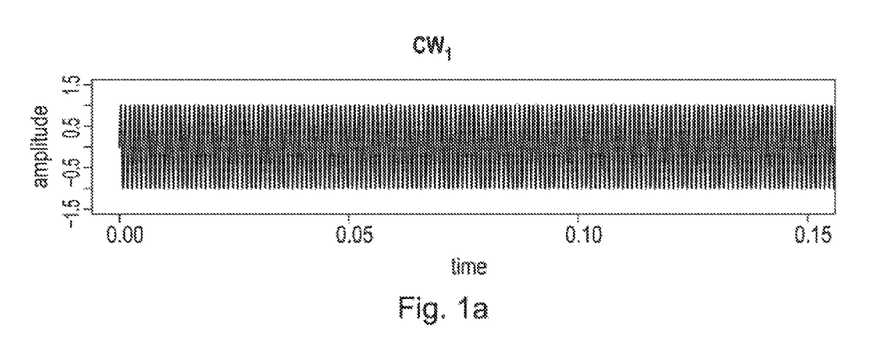
FIGS. 1a, 1b, and 1c illustrate an example of Binary Amplitude Shift Keying (ASK) modulation for a channel 1 message.
Figure 1B:
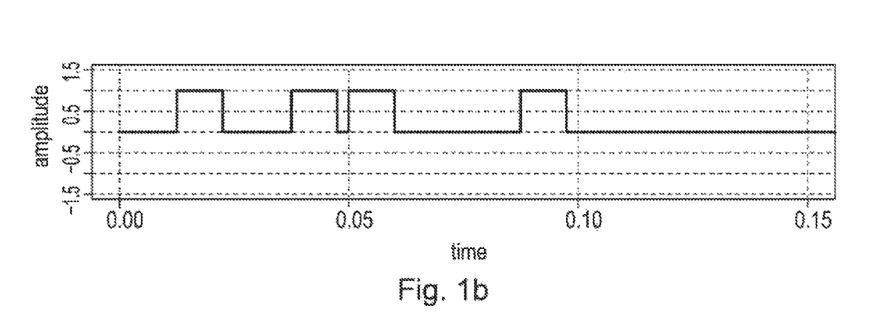
Figure 1C:
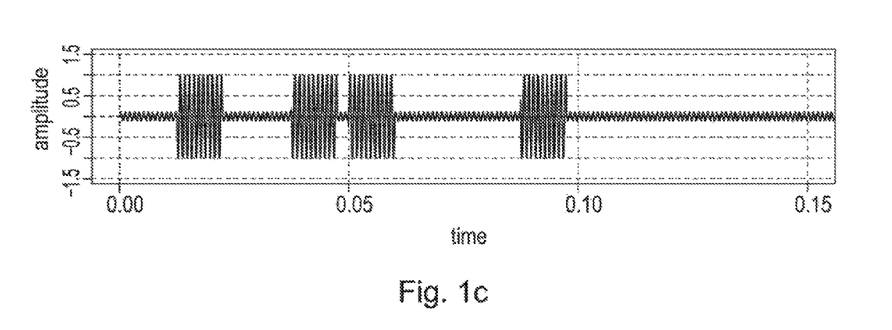
Figure 2:
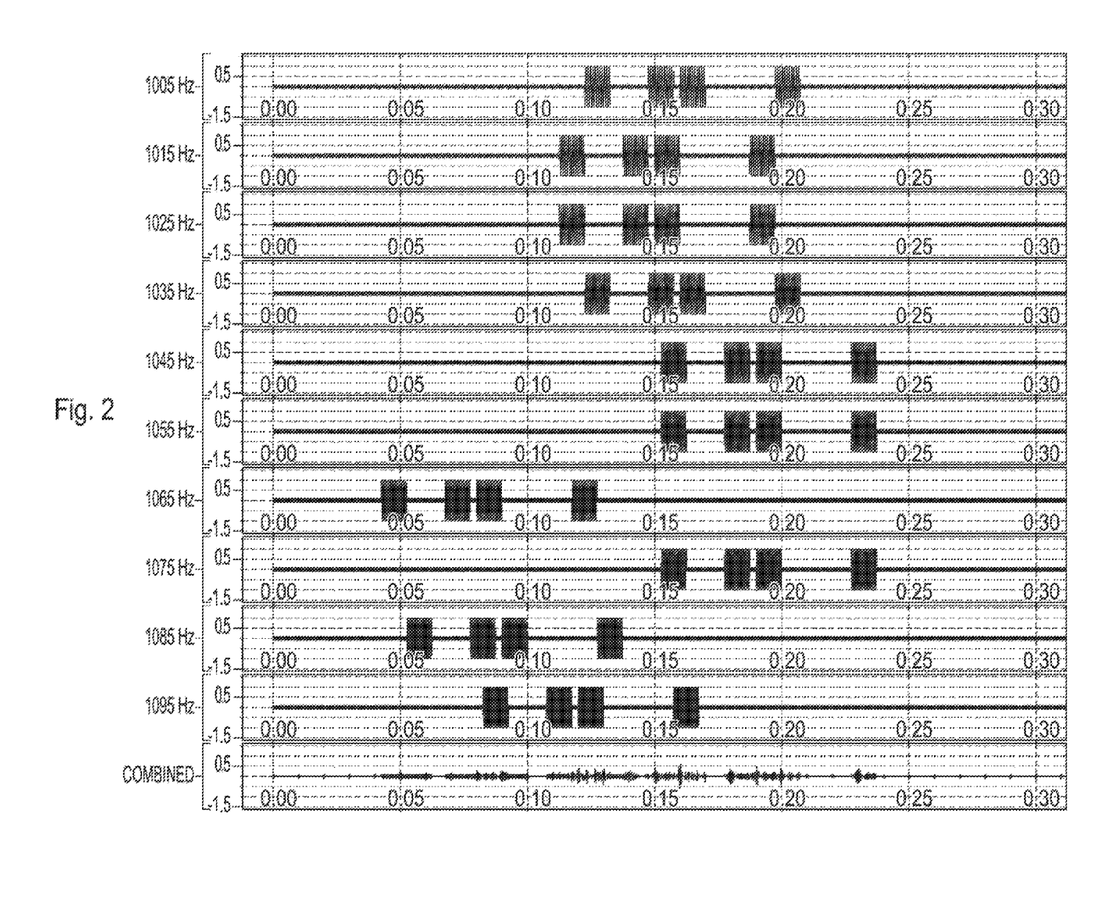
FIG. 2 illustrates encoding for the channel 1 message depicted in FIGS. 1a, 1b, and 1c.

FIG. 1a represents carrier wave $CW_1$. FIG. 1b represents mask: (0, 1, 0, 1, 1, 0, 0, 1). FIG. 1c represents a signal. Together, FIGS. 1a, 1b, and 1c illustrate an example of Binary Amplitude Shift Keying (ASK) modulation for a channel 1 message. FIG. 2 is a signal encoding for bits (0, 1, 0, 1, 1, 0, 0, 1) and offsets (11, 10, 10, 11, 14, 14, 3, 14, 4, 7).

Figure 3A:
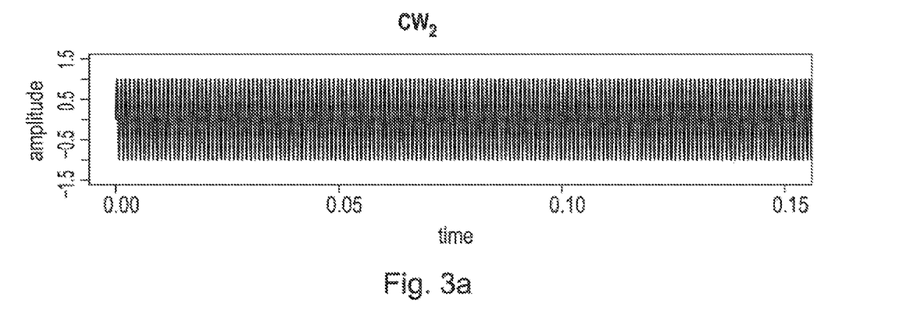
FIGS. 3a, 3b, and 3c illustrate an example of Binary Amplitude Shift Keying (ASK) modulation for a channel 2 message.
Figure 3B:
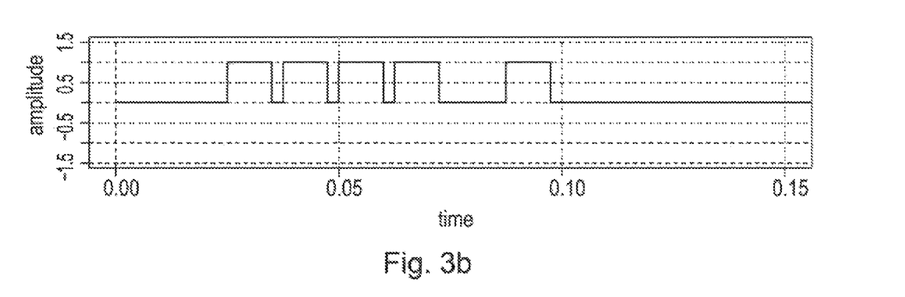
Figure 3C:
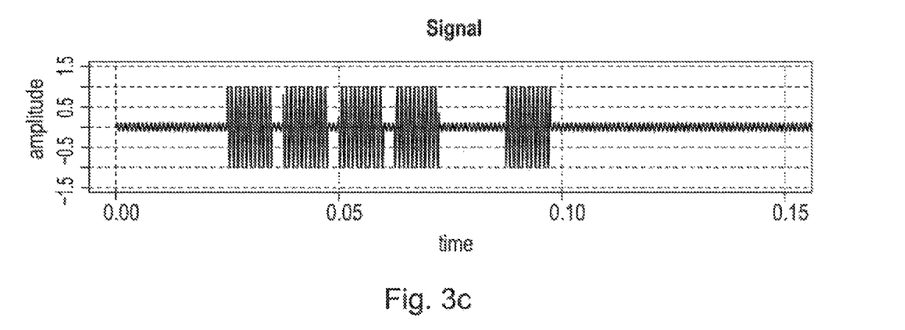
Figure 4:
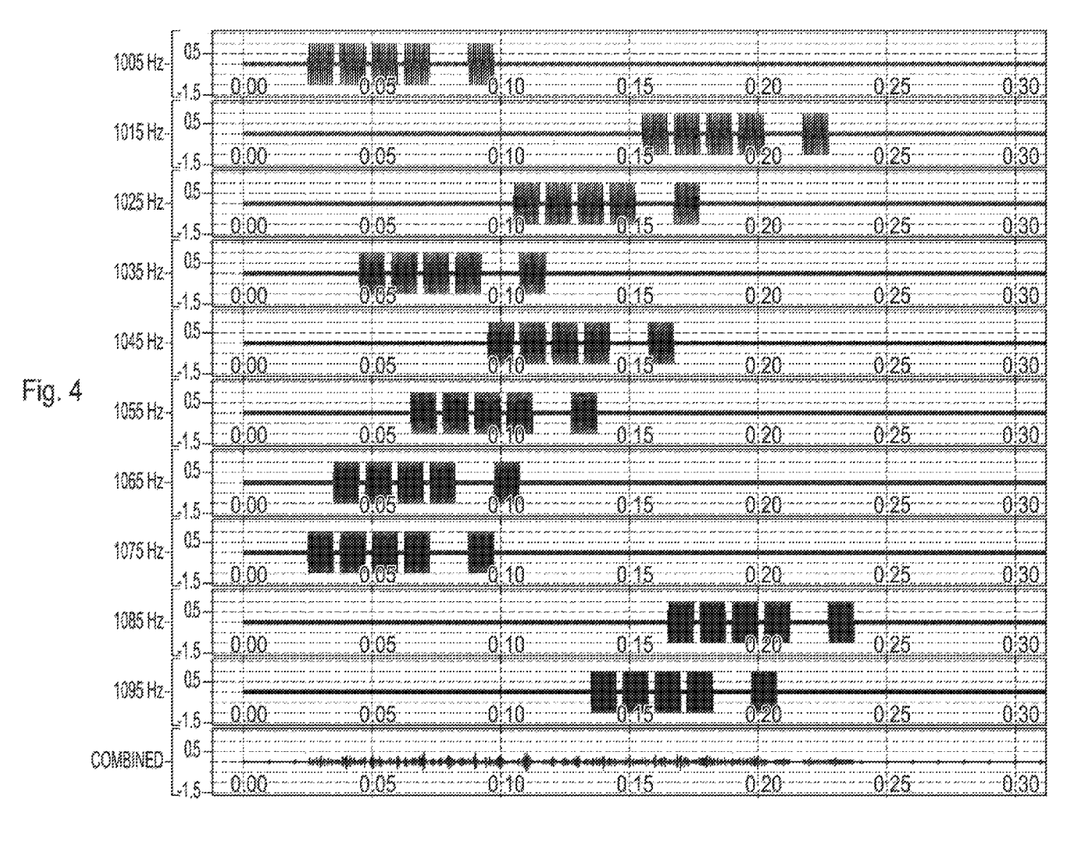
FIG. 4 illustrates encoding for the channel 2 message depicted in FIGS. 3a, 3b, and 3c.

FIG. 3a represents carrier wave $CW_2$. FIG. 3b represents mask: (0, 0, 1, 1, 1, 1, 0, 1). FIG. 3c represents a signal. Together, FIGS. 3a, 3b, and 3c illustrate an example of Binary Amplitude Shift Keying (ASK) modulation for a channel 2 message. FIG. 4 is a signal encoding for bits (0, 0, 1, 1, 1, 1, 0, 1) and offsets (0, 13, 8, 2, 7, 4, 1, 0, 14, 11).

Figure 5:
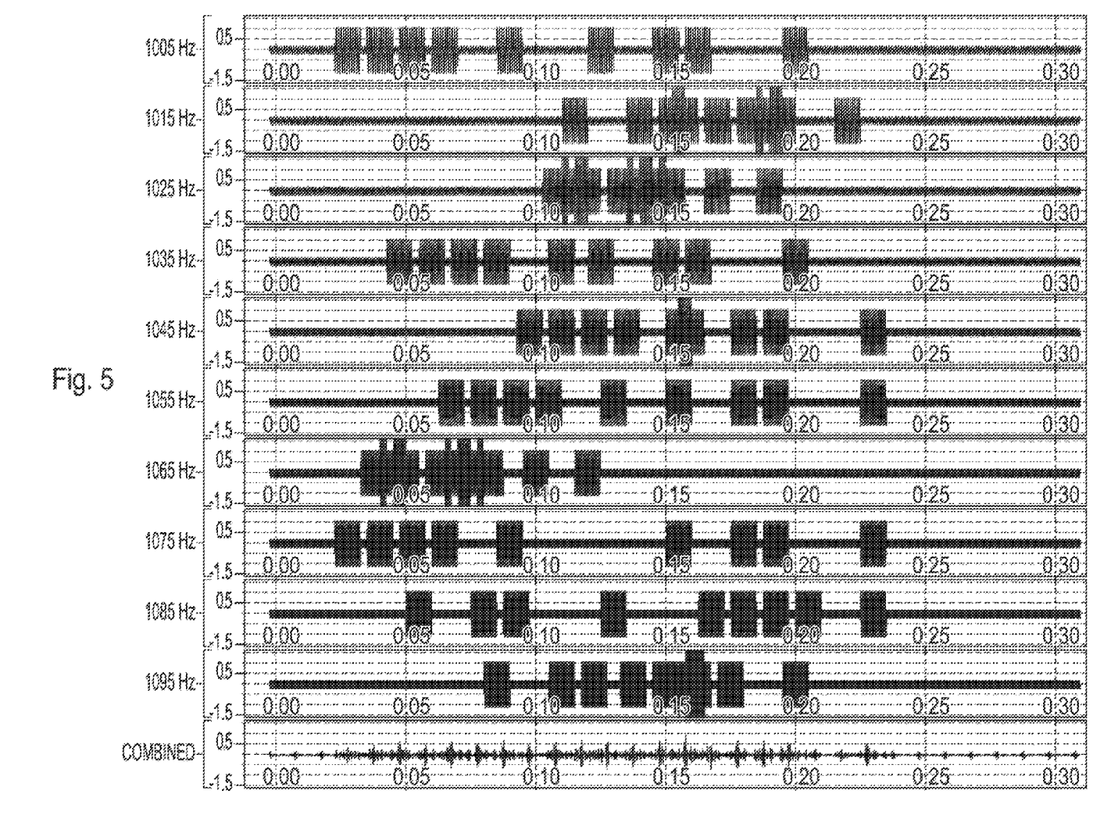
FIG. 5 depicts the combined signals for channel 1 and channel 2.
Figure 6A:
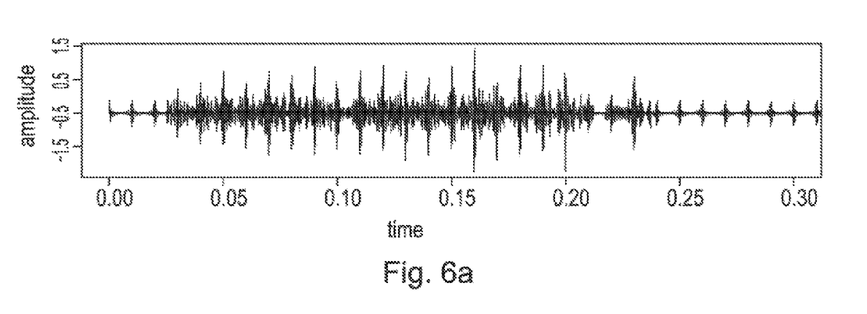
FIGS. 6a, 6b, and 6c illustrate the decoding of the combined signals into messages 1 and 2.
Figure 6B:
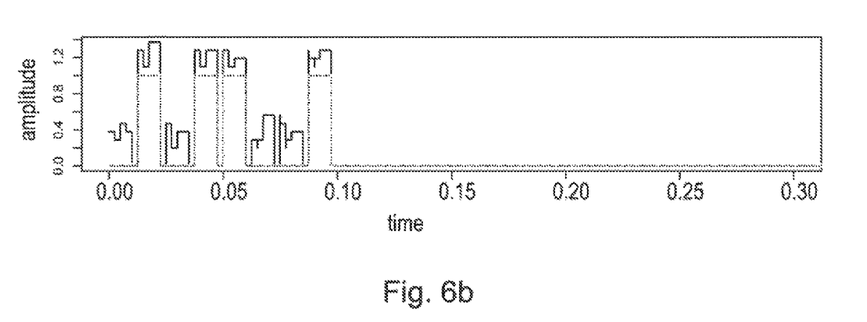
Figure 6C:
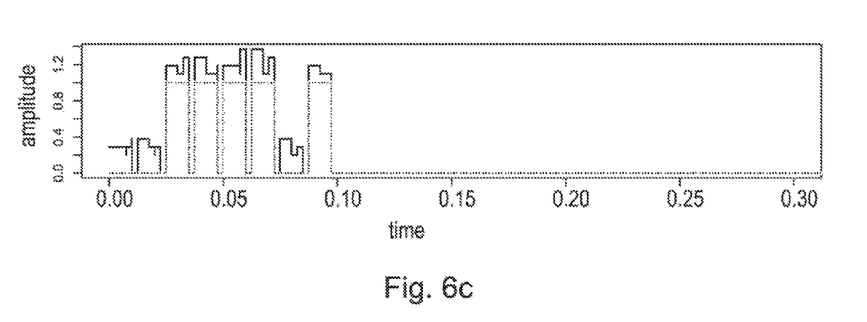
Figure 7:
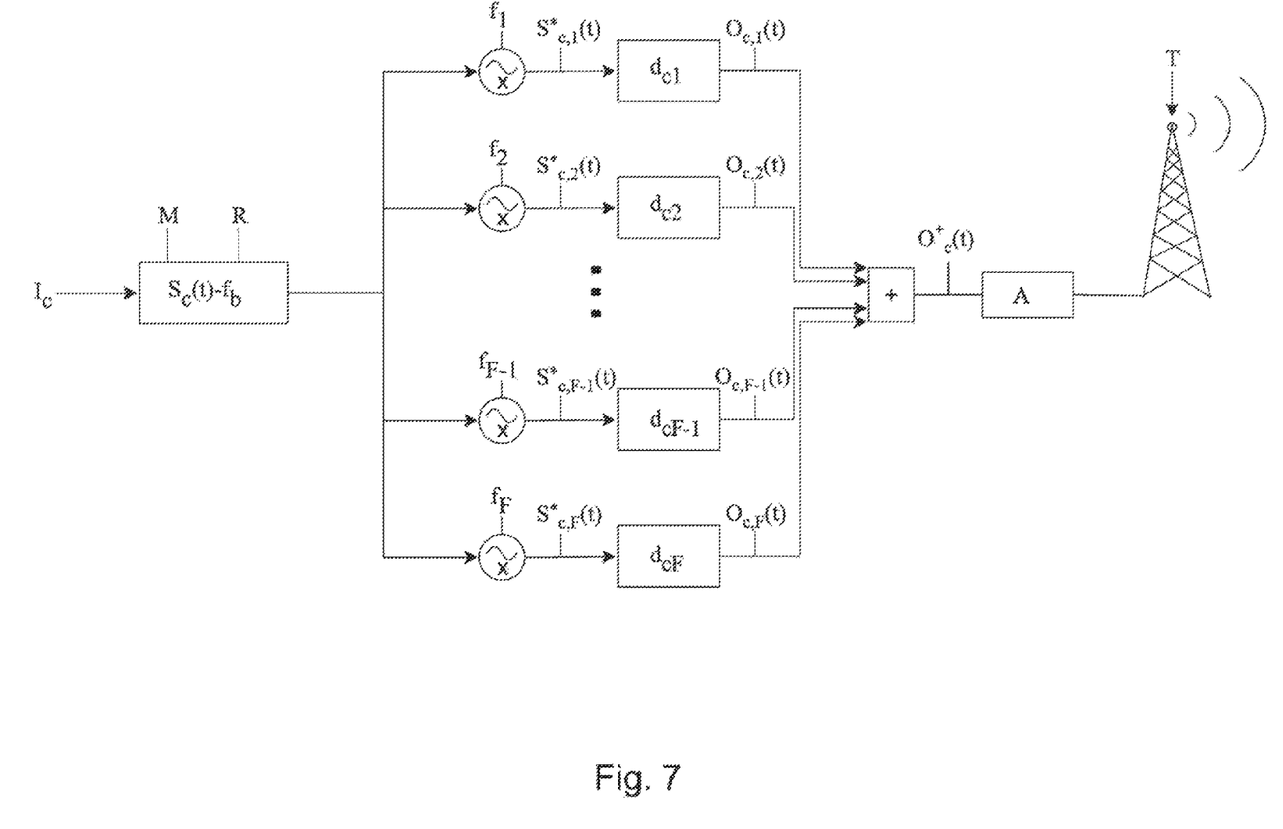
FIG. 7 is a diagram of an example encoder for a single data stream.
Figure 8:
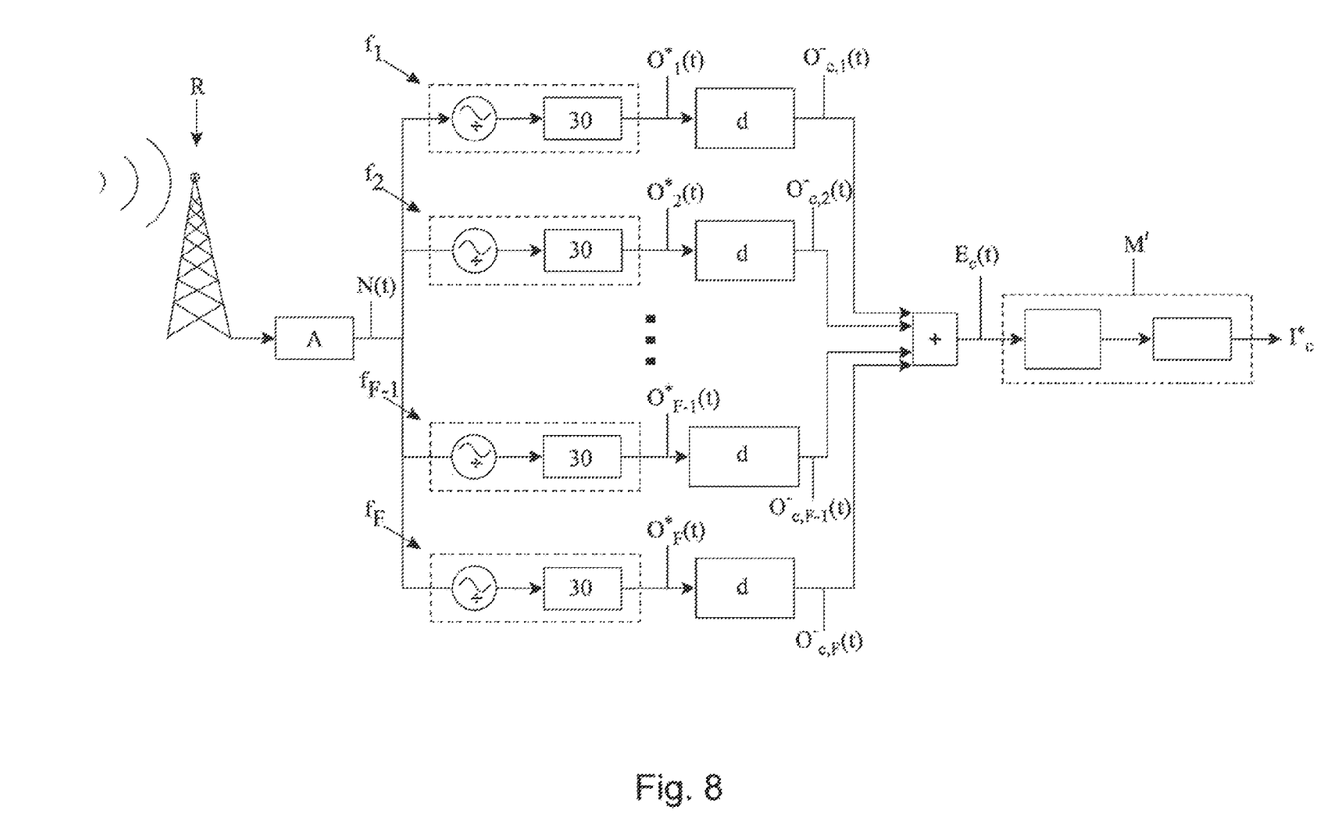
FIG. 8 is a diagram of an example decoder for a single data stream.

FIG. 5 is the combined signals for channel 1 and channel 2. FIGS. 6a, 6b, and 6c illustrate the decoding of the combined signals into messages 1 and 2. FIG. 7 is a diagram of an example encoder for a single data stream. FIG. 8 is a diagram of an example decoder for a single data stream.

The following should be viewed in light of FIGS. 1a through 8. Transmission occurs on a set of F>1 frequencies, $f_1, f_2, \ldots, f_F$, each of which is the center of a frequency interval with the same bandwidth B. For each communications channel, select a set of F offset delays: $d_{c,1}, d_{c,2}, \ldots, d_{c,F}$, such that no two channels share the same set of offsets. Modulation M (along with corresponding demodulation/decoding method M') and data rate R that are compatible with bandwidth B and the selected frequencies are selected. In other words, M and R must be compatible with each pair $(f_i, B)$. Common modulation examples include binary amplitude shift keying (ASK), binary phase shift keying (BPSK), gaussian-mean shift keying (GMSK), quadrature amplitude modulation (n-QAM), etc.

Encoding the Data Stream for a Single Logical Channel

As shown in FIG. 7, encoding a data stream $I_c$ for channel c proceeds as follows:

1. Modulate the input data stream $I_c$ using modulation M at data rate R to generate symbol stream $S_c(t)$ at baseband frequency $f_b$.
2. For each transmission frequency $f_i$, i=1, 2, ... F (note that the order of the following two steps may be reversed):
   a. Use a frequency multiplier to convert symbol stream $S_c(t)$ from baseband frequency $f_b$ to transmission frequency $f_i$ to form transmission symbol stream $S^*_{c,i}(t)$.
   b. Apply a time delay of $d_{c,i}$ to transmission symbol stream $S^*_{c,i}(t)$ to yield delayed transmission symbol stream $O_{c,i}(t)$.
3. Combine the delayed transmission symbol streams $O_{c,i}(t)$ by component-wise addition to yield the combined signal $O^+_c(t)$.
4. Amplify A the combined signal $O^+_c(t)$ (if necessary) and send to transmitter T.

Decoding the Data Stream for a Single Logical Channel

As shown in FIG. 8, decoding data stream $I^*_c$ for channel c proceeds as follows:

1. Receive signal from receiver R and amplify A (if necessary) to yield combined signal N(t), which may include noise and interference, including signals from other communications channels.
2. For each transmission frequency $f_i$, i=1, 2, ... F (note that order of the following two steps may be reversed):
   a. Use filter 30 and frequency-divider pair (or frequency-divide and then filter 30) to convert the combined N(t) from transmission frequency $f_i$ to baseband frequency $f_b$ to yield $O^*_i(t)$.
   b. Reverse the offset delay, e.g., by applying delay d of the form $d_{c,max}-d_{c,i}$ where $d_{c,max}=\max(d_{c,i})$ over i=1, 2, ..., F to form $O^-_{c,i}(t)$.
3. Combine the now-aligned baseband signal streams $O^-_{c,i}(t)$ (via addition) to form the estimated symbol stream $E_c(t)$.
4. Apply the demodulation/decoder method M' to estimated symbol stream $E_c(t)$ yielding the output data stream $I^*_c$.

When the receiver(s) have access to offsets for multiple channels $\{d_{c,i}\}$, multi-channel decoders can be constructed that reduce the error rate in $I^*_c$ by performing joint estimation of the symbol streams $\{E_{c,i}(t)\}$.

One example embodiment includes:

A single physical transmitter sending C=2 logical channels

Two physical receivers, each decoding a single logical channel c

Amplitude-shift keying (ASK), with amplitude of ±1 Volt for the modulation M

F=10 frequency bands each of width B=10 hz, spanning 1000 hz to 1100 hz, centered at $f_1$=1005 hz, $f_2$=1015 hz, ... $f_{12}$=1095 hz Data rate of R=10 samples/sec Offsets for each channel c selected by sampling the $d_{c,i}$ with replacement from the set {0.0 sec, 0.10 sec, ..., 2.00 sec}, i.e. 0 through 20 cycle lengths.

Receivers amplify the received signals to amplitude of ±1 Volt.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. In a communication system having a single transmitting antenna and a single receiving antenna, a method of processing a signal, comprising the steps of:
   (a) modulating the signal using a specified modulator and baseband frequency to form a modulated baseband signal;
   (b) converting the modulated baseband signal into multiple transmission frequencies;
   (c) delaying the modulated signal for each transmission frequency included in the multiple transmission frequencies by a time delay specific to said each transmission frequency;
   (d) combining said delayed modulated signals at said multiple transmission frequencies into a single combined signal for transmission;
   (e) sending the combined signal from said single transmitting antenna;
   (f) receiving the combined signal, where said receiving is done by said single receiving antenna;
   (g) reversing the time delay specific to said each transmission frequency;
   (h) converting said each transmission frequency to a respective baseband signal at the baseband frequency; and,
   (i) combining and demodulating the respective baseband signals using a demodulator corresponding to the modulation used in (a).

2. The method of signal processing recited in claim 1 wherein the modulation is a form of binary amplitude shift keying modulation.

3. The method of signal processing recited in claim 1 wherein the method is applied in a wired communications network.

4. The method of signal processing recited in claim 1 wherein the method is applied in a wireless communications network.

5. The method of signal processing recited in claim 1 wherein the method is applied in a fiber-optic communications system.

6. The method of signal processing recited in claim 1 wherein the modulation is a form of binary phase shift keying.

7. The method of signal processing recited in claim 1 wherein the modulation is a form of gaussian-mean shift keying.

8. The method of signal processing recited in claim 1 wherein the modulation is a form of quadrature amplitude modulation.

9. The method of signal processing recited in claim 1 wherein said combined signal is amplified by a single amplifier prior to transmission.

10. A communication system for processing, transmitting, and receiving a signal, comprising:
   (a) a modulator operatively arranged to modulate the signal using a specified modulator and baseband frequency to form a modulated baseband signal;
   (b) a first converter operatively arranged to convert the modulated baseband signal into multiple transmission frequencies and to delay the modulated signal for each transmission frequency included in the multiple transmission frequencies by a time delay specific to said each transmission frequency;
   (c) a second converter operatively arranged to combine said delayed modulated signals at said multiple transmission frequencies into a single combined signal for transmission;
   (d) a transmitter operatively arranged to send said single combined signal from a single transmitting antenna;
   (e) a receiver operatively arranged to receive said single combined signal via a single receiving antenna;
   (f) a third converter operatively arranged to reverse the time delay specific to said each transmission frequency and to convert said each transmission frequency to a respective baseband signal at the baseband frequency; and,
   (g) a demodulator operatively arranged to combine and demodulate the respective baseband signals corresponding to the modulation scheme used in step (a).

* * * * *